Dec. 22, 1925.
F. M. GRAHAM
1,566,959
ICE CREAM STORAGE CABINET
Filed April 27, 1925
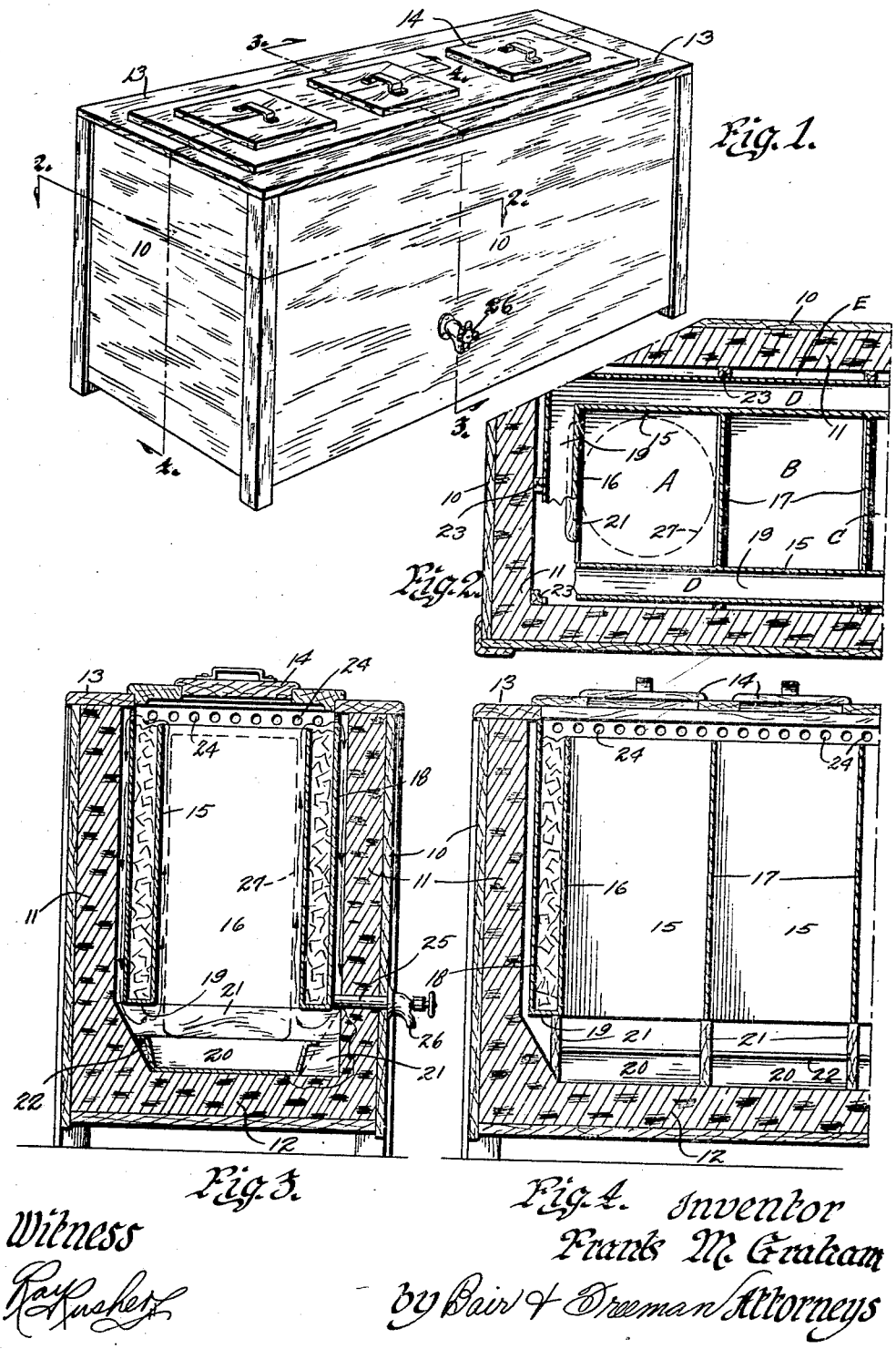
Witness
Ray Rusher
Inventor
Frank M. Graham
by Bair & Freeman Attorneys Patented Dec. 22, 1925.

UNITED STATES PATENT OFFICE.

FRANK M. GRAHAM, OF OTTUMWA, IOWA.

ICE-CREAM-STORAGE CABINET.

Application filed April 27, 1925. Serial No. 26,031.

*To all whom it may concern:*

Be it known that I, FRANK M. GRAHAM, a citizen of the United States, and a resident of Ottumwa, in the county of Wapello and State of Iowa, have invented a certain new and useful Ice-Cream-Storage Cabinet, of which the following is a specification.

My invention relates to ice cream storage cabinets of the dry pack type.

The purpose of my invention is to provide an ice cream storage cabinet having a compartment or compartments for receiving containers for ice cream or other articles, which it is desired to keep cool and having outside such storage compartment or compartments, a compartment for ice, brine and the like open at the top but not otherwise in communication with the storage compartment or compartments. This ice and brine compartment, I will call the ice and salt pan.

A further object is to provide an ice cream storage cabinet of the kind mentioned having an outer casing with heat insulated walls and provided with a passage or passages outside the ice and salt pan, which passage or passages are of less capacity than the storage compartment or compartments and are in communication with the storage compartment or compartments at the top and bottom thereof, whereby there is insured a circulation downwardly outside and around the bottom of the ice and salt pan to and upwardly through the storage compartment or compartments.

With these and other objects in view, my invention consists in the construction, arrangement and combination of the various parts of my ice cream storage cabinet, whereby the objects contemplated are attained, as hereinafter more fully set forth, pointed out in my claims, and illustrated in the accompanying drawings, in which:

Figure 1 shows a perspective view of an ice cream storage cabinet embodying my invention.

Figure 2 is a horizontal, sectional view taken on the line 2—2 of Figure 1.

Figure 3 is a transverse, vertical, sectional view taken on the line 3—3 of Figure 1; and Figure 4 is a longitudinal sectional view of the cabinet taken on the line 4—4 of Figure 1.

In the accompanying drawings, I have used the reference numeral 10 to indicate generally the outside cabinet, which is provided with the heat insulated walls 11 and bottom 12, the fixed cover members 13 and one or more removable cover members 14.

It is my purpose to provide in such a cabinet one or more storage compartments with an ice and salt pan outside the storage compartment and an air passage outside the ice and salt pan.

The form and construction of these compartments may be varied considerably. In the particular form in which I have illustrated the invention in my drawings, I have shown a series of three storage compartments A, B and C arranged in alignment in the casing 10, having the common side walls 15, end walls 16 and the partitions 17.

These compartments A, B and C are open at the top and bottom. Outside the storage compartments A, B and C is the ice and salt pan D, which as shown here entirely surrounds the storage compartments.

It is obvious, however, that the result I desire to attain could be secured in a substantial degree if the ice and salt pan did not extend entirely around the storage compartments.

The inner wall or walls of the ice and salt pan are formed by the walls 15 and 16. The ice and salt pan has the outer wall or walls 18, which at its upper end extends above the walls 15 and 16 as shown in Figure 3. The ice and salt pan has the closed bottom 19 as clearly shown in Figures 3 and 4.

On the bottom of the casing 10 in order to protect the cork composition and to afford a support for ice cream containers or the like, some bottom member such as the wooden slat structure 20 is provided. Supporting the slats 20 are transverse supporting members 21, for holding the ice and salt pan and the storage compartments spaced above the bottom of the cabinet 10.

It might perhaps be mentioned that the ice and salt pan and storage compartments are made of galvanized metal or any material suitable for the purpose.

The cross pieces 21 have portions 22 cut away in any suitable manner for affording free air circulation.

The walls 18 are kept in proper spaced relation to the inner surfaces of the walls of the cabinet 10 by means of spacer strips or the like 23.

In the form of the device shown in my drawings, the walls 18 extend to the fixed top members 13, as shown in Figures 3 and 4, and are provided at their upper ends with a series of holes 24 to allow free circulation over the top of said walls.

This particular structure of course could be varied and any structure adopted, which would permit the air to pass freely over the top of the walls 18.

It will be noted that the lower end of the ice and salt pan terminates above the bottom of the cabinet 10. It should perhaps be mentioned that the ice and salt pan is provided with a drain pipe 25 leading from its lower part through the wall of the cabinet 10 and having a control cock 26 for permitting the draining and flushing of such pan.

It is particularly to be noted that the walls 18 of the ice and salt pan are spaced slightly from the walls of the outer cabinet 10 and that the capacity of the passage or passages formed between the walls 18 and the walls of the cabinet 10 is less than the capacity of the storage compartments A, B and C. This is a matter of importance for the reasons which will now be set forth.

In the practical use of my improved ice cream storage cabinet, ice cream cans, such as the can 27 shown in dotted lines in Figures 2 and 3, or bricks of ice cream or other articles, which are to be kept cool, are placed in the storage compartments A, B and C after the ice and salt pan has been filled with cracked ice and salt.

The construction of my ice cream cabinet is such that when the ice has been placed in the pan and the material to be cooled is placed in the storage compartments and the covers 14 replaced on the cabinet 10, the desired air circulation will be created for affording a maximum cooling of the ice cream or other articles in the storage compartments with a maximum uniformity of temperature and with a minimum consumption of ice and salt.

A circulation of air will be immediately created downwardly through the passage E between the wall 18 and the wall of the cabinet 10, thence around the bottom of the ice and salt pan, and thence upwardly through the storage compartment around the articles, which are to be subjected to the refrigerating or cooling action of the ice cream storage cabinet.

This circulation of air is accomplished by the construction to which attention will now be called and has the advantages hereinafter more fully referred to.

Because of the fact that the capacity of the compartment or passage E is less than the capacity of the compartments A, B and C, and because of the further fact that the cooling surface of the outside of the ice and salt pan is greater in area than the cooling surface of the inside of the ice and salt pan, the relatively small amount of air in the compartment or passage E outside the ice and salt pan will be quickly cooled and will drop. The slightly warmer air around the articles in the storage compartment will rise. There will then be established a circulation of air downwardly through the passage E around the bottom of the ice and salt pan and upwardly through the compartments A, B and C, thence through the holes 24 and again downwardly through the passage E. This circulation is a desirable one for certain important reasons.

When the ice cream is placed in the cabinet, the warmer air in the cabinet will obviously be at the upper part thereof. On account of the circulation of air, which is immediately established owing to the features of construction already mentioned, it is obvious that this warm air instead of passing downwardly immediately around the ice cream, will first pass downwardly outside the ice and salt pan through the passage 18, and during its downward movement to the lower end of the ice and salt pan will be cooled before it passes upwardly around the ice cream.

Thus the moving current of circulating air will all be cooled from the ice and salt pan during its movement downwardly through the passage E before it reaches the ice cream in the storage compartments.

It will be obvious that circulation will be immediately established after the cabinet is closed, and that thereafter the ice cream or other contents of the storage compartments will be subjected only to circulating air which has first been properly cooled.

A circulation of the air of the kind that has just been described is obviously desirable and has advantages over a circulation in which the air might first pass downwardly through the storage compartments and thence upwardly around the outside of the ice and salt pan.

By means of the construction which I have described, and the resulting manner of circulation wherein a constantly moving comparatively thin sheet of air is subjected to immediate contact with the outside of the ice and salt pan, I find that the ice cream after it has been placed in the storage compartment or after the storage compartment has been opened to remove part of the ice cream, and the covers are replaced, is very quickly subjected to the action of the freshly cooled air.

I find further that the warmer air at the top of the cabinet is very quickly cooled. The action is such that the temperature is more uniformly maintained than with any other ice cream cabinet of this general type of which I am aware.

I find that in addition to the quickness with which the circulation is started up and in addition to the maintaining of almost uniform temperature, there is another advantage in this structure in the fact that my cabinet operates with a minimum amount of salt and ice and effects a substantial saving in the amount of ice used.

One fact that contributes to insuring the desired circulation is the extension of the ice pan around the interior of the cabinet in such manner that the cooling area of its outer wall is greater than the cooling area of its inner wall.

Owing to the maintenance of the uniform temperature and to the quickness with which the circulation is again established and has become operative after the cabinet has been opened, I find that ice cream can be kept properly hard and cold for a substantially longer time with one packing with this cabinet than with any other of the same general type of which I have been able to learn.

It is obvious from the foregoing that with a device of this kind, the entire cooling surface of the ice and salt pan is effectively used.

While I have illustrated in my drawings one particular form in which the invention may be embodied, I realize that the device may be made in a great variety of forms, and it is not my intention to limit myself to the particular form here disclosed, but it is my intention to cover by my claims any modified forms of structure or use of mechanical equivalents, which may be reasonably included within their scope.

I claim as my invention:

1. In an ice cream storage cabinet, an outer cabinet, a container for refrigerant therein comprising a narrow pan extending entirely around the interior of the cabinet, spaced from the walls and the bottom thereof, the inner wall of the pan terminating short of the top of the cabinet while the outer wall is extended to the top of the cabinet and provided at its upper part with holes to allow air circulation across the top of the pan.

2. In an ice cream storage cabinet, an outer cabinet, a narrow container for refrigerant extending around the interior of the cabinet spaced from the side walls, top and bottom of the cabinet to form a narrow compartment outside the container and to form a storage compartment and to allow communication between the compartments above and below the container, a partition in the storage compartment terminating short of the top and of the bottom of the cabinet, for dividing the storage compartment into smaller compartments having free communication at top and bottom.

3. In an ice cream storage cabinet, an outer cabinet, a narrow container for refrigerant extending around the interior of the cabinet spaced from the side walls and from the top and the bottom of the cabinet to form a narrow compartment outside the container and to form a storage compartment and to allow communication between the compartments above and below the container, and means for supporting the contents of the storage compartment above the bottom thereof and for allowing free circulation below such contents.

4. In an ice cream storage cabinet, an outer cabinet, a container for refrigerant having the form of a pan extending entirely around the inside of the cabinet, spaced from the side walls and from the top and the bottom thereof, so as to provide an inner storage compartment and a narrow compartment outside the pan entirely around the storage compartment, said compartments being in communication above and below the pan, and whereby the outer wall of the pan affords a greater cooling area than does the inner wall of the pan the cubic air capacity of the outer chamber being less than the cubic air capacity of the inner chamber for the purpose of producing a lower temperature in the outer chamber.

5. In an ice cream storage cabinet, an outer cabinet, a relatively narrow container for refrigerant extending around the interior of the cabinet spaced from the side walls and from the top and the bottom thereof, for thus forming a storage compartment and an outer circulating compartment communicating with each other above and below the container, the container being extended around the interior of the cabinet so that the outer wall of the container has a greater cooling area than has the inner wall thereof.

Des Moines, Iowa, April 21, 1925.

FRANK M. GRAHAM.